United States Patent [19]
McDaniel

[11] Patent Number: 6,028,313
[45] Date of Patent: Feb. 22, 2000

[54] DIRECT CONVERSION PHOTON DETECTOR

[76] Inventor: David L. McDaniel, 13190 Northey Rd., Dousman, Wis. 53118

[21] Appl. No.: 09/001,494

[22] Filed: Dec. 31, 1997

[51] Int. Cl.[7] .................................................. G01T 1/185
[52] U.S. Cl. ............................. 250/370.09; 250/370.11; 250/370.13; 250/338.4
[58] Field of Search .......................... 250/370.09, 370.11, 250/370.13, 338.4

[56] References Cited

U.S. PATENT DOCUMENTS

| | | |
|---|---|---|
| 5,198,673 | 3/1993 | Rougeot et al. . |
| 5,576,547 | 11/1996 | Ferreira et al. . |
| 5,677,539 | 10/1997 | Apotovsky et al. . |
| 5,777,338 | 7/1998 | He ...................................... 250/370.13 |

*Primary Examiner*—Constantine Hannaher
*Assistant Examiner*—Andrew Israel
*Attorney, Agent, or Firm*—Quarles & Brady; Christian G. Cabou; Phyllis Y. Price

[57] ABSTRACT

A direct conversion nuclear particle detector including an absorption member having cathode and anode surfaces, a cathode attached to the cathode surface, a plurality of anodes attached to the anode surface and a shaping electrode also attached to the anode surface, adjacent anodes are separated by gaps, the electrode is attached to the anode surface within the gaps such that the electrode and each adjacent anode forms a space, the anodes are linked by a resistive network and at least two anodes are attached to amplifiers, the amplifiers generating signals which can be used to identify when a photon has been absorbed by the absorption member and approximately where with respect to the cathode surface the absorption occurred.

11 Claims, 3 Drawing Sheets

DIRECT CONVERSION PHOTON DETECTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to gamma cameras and more particularly to direct conversion photon ray detectors.

Single photon emission computed tomography (SPECT) examinations are carried out by injecting a dilution marker comprising a compound labeled with a radiopharmaceutical into the body of a patient to be examined. A radiopharmaceutical is a substance that emits photons at energy levels within a known marker range. By choosing a compound that will accumulate in an organ of interest (i.e. an organ to be imaged), compound concentration, and hence radiopharmaceutical concentration, can be substantially limited to an organ of interest. A radiopharmaceutical that emits photons or gamma emissions which are approximately at a single known energy level is typically chosen.

While moving through a patient's blood stream the marker, including the radiopharmaceutical, becomes concentrated in the organ of interest. By measuring the number of photons emitted from the organ of interest which have an energy within the marker range, organ characteristics, including irregularities, can be identified.

To measure the number of emitted photons, one or more photon detecting cameras are used. After a marker has become concentrated within an organ of interest, a camera is positioned at an imaging angle with respect to the organ of interest such that the organ is positioned within the camera's field of view FOV. The camera is designed to detect photons traveling along preferred paths within the FOV.

Most gamma cameras consist of a collimator, a scintillation crystal, a plurality of photomultiplier tubes (PMTs) and a camera processor. For the purposes of this explanation cameras including a collimator, a crystal and PMTs will be referred to as scintillation cameras. The collimator typically includes a rectangular lead block having a width dimension and a length dimension which together define the FOV. The collimator block forms tiny holes which pass therethrough defining the preferred photon paths. The collimator blocks emissions toward the crystal along non-preferred paths.

The scintillation crystal is positioned adjacent the collimator on a side opposite the FOV and has an impact surface and an oppositely facing emitter surface. The impact surface defines a two dimensional imaging area. Photons which pass through the collimator impact and are absorbed by the impact surface at impact points. The crystal emitter surface emits light from an emitter point adjacent the impact point each time a photon is absorbed.

The PMTs are arranged in a two dimensional array which is positioned adjacent the emitter surface. Light emitted by the crystal is detected by the PMTs. Each PMT which detects light generates an analog intensity signal which is proportional to the amount of light detected. When a single photon is absorbed by the crystal, the emitted light is typically detected by several different PMTs such that several PMTs generate intensity signals simultaneously.

The processor receives all intensity signals and performs a plurality of calculations to determine precise coordinates X and Y on the impact surface at which a photon impact point occurred. Once coordinates X and Y of all photons have been identified, the processor uses coordinates X and Y to create an image of the organ of interest which corresponds to the camera imaging angle.

While scintillation cameras generate diagnostic quality images, these cameras have a number of shortcomings. First, because each scintillation camera includes a collimator, a crystal and a plurality of PMTs, each camera requires a relatively large volume. Also, while each of the collimator, crystal and PMTs separately is not extremely heavy, together the components are unwieldy. For these reasons it is difficult to manipulate scintillation cameras and most scintillation camera systems require a relatively complex and expensive supporting mechanism. For example, many scintillation cameras are mounted on large doughnut shaped gantries for rotation about an imaging axis.

In addition to increasing system costs, a gantry system capable of providing sufficient support to one or more scintillation cameras often renders the camera system immobile so that the system requires its own dedicated room and cannot be transported to an immobile patient (e.g. in an emergency room).

Furthermore, because each photon absorbed by the scintillation crystal causes a plurality of intensity signals (e.g. one intensity signal generated by each PMT), an extremely fast camera processor is required to process all of the intensity signals for identifying impact locations. In fact, in many cases processors are incapable of processing all intensity signals caused by each absorbed photon and therefore only a subset of intensity signals caused by each photon are processed, image accuracy sacrificed for speed.

To overcome the shortcomings associated with PMT cameras, the industry has developed a new generation of photon detectors generally referred to as direct conversion detectors DCDs. Most of these detectors are based on pixilated Cadmium Telluride CdTe or Cadmium Zinc Telluride CdZnTe devices. Generally, each DCD includes an absorption member, a cathode, at least one anode, a potential biasing mechanism (i.e. voltage source) and a separate amplifier for each anode.

The absorption member is formed of a planar semiconductor material (e.g. CdTe or CdZnTe) which has oppositely facing cathode and anode surfaces. The dimension between the cathode and anode surfaces is an absorption member thickness. When photons are directed at the cathode surface, the photons penetrate the absorption member and each photon is absorbed at an absorption depth within the member thickness. Photon absorption depths vary widely. When a photon interacts with the absorption member while being absorbed, the absorption member generates a plurality of electrons and holes.

The cathode is attached to and essentially covers the cathode surface and the anode is attached to the anode surface. The biasing mechanism is linked to the cathode and biases the cathode negative. The anode remains unbiased and therefore is positive with respect to the cathode. Because the cathode is negative and the anode is positive with respect to the cathode, when electrons and holes are generated during absorption, the holes are attracted to the cathode surface and the electrons are attracted to the anode surface. The electrons generate a first negative charge component on the anode.

As holes accumulate at the cathode, the positive charge adjacent the cathode causes a capacitive second negative charge component on the anode. To distinguish between the first negative charge component on the anode caused by electrons which travel from the absorption depth to the anode and the second negative charge component on the anode caused by the holes, the first negative charge component will be referred to hereinafter as the electron charge and the second negative charge component will be referred to hereinafter as the hole charge. Together, the electron charge and the hole charge are referred to hereinafter as the collected charge. The amplifiers do not distinguish between the electron charge and the hole charge and therefore amplify the entire collected charge.

The amplifier is attached to the anode and includes an output lead for providing an anode signal indicating the collected charge. The amplifier output lead is linked to a camera processor. The processor integrates the anode signal over an integration period and provides an intensity signal. The processor compares the intensity signal to an expected intensity signal associated with a photon having an energy within the marker range. When an intensity signal is equal to or exceeds the expected intensity signal, the processor indicates that a photon has been detected by the DCD which provided the anode signal.

Energy resolution (i.e. intensity signal resolution) of DCDs is primarily limited by three different phenomenon: (1) leakage current, (2) capacitive DCD noise associated with electronics used to configure the DCD and (2) incomplete charge collection.

The leakage current between the anode and cathode arises from two sources. First, there is a voltage difference between the anode and cathode and the material between them has a large but finite resistance. This leads to a small current flow between the anode and the cathode. Second, electron/hole pairs are thermally generated between the anode and cathode. These electron/hole pairs drift toward the anode and cathode, respectively, thus generating a small current. The amplifiers do not distinguish between the leakage current and the electron/hole charge caused by the absorbed photons and thus the leakage current operates as a noise source.

The leakage current can be reduced by several methods. First, by using highly resistive bulk material, the component of leakage current due to the finite resistance between the anode and cathode can be reduced. Second, by using bulk material which has a large gap between the conductive band and any populated (i.e. area having an electron) levels in the material, the number of thermally generated electron/hole pairs can be reduced. Third, the operating temperature of the DCD can be reduced, thus reducing the thermally generated leakage current. Fourth, by minimizing the integration time of the electronics, the amount of charge measured by integrating the leakage current is also minimized. The minimum integration time is determined by the time required for the signal from electrons and holes generated by a photon to be collected.

Most of the electronic noise is associated with the input capacitance of the amplifier (i.e. the DCD capacitance). Reducing the capacitance of the DCD therefore reduces this noise source.

In an effort to reduce DCD capacitance, the basic DCD configuration described above has been modified in several different ways. First, because DCD capacitance is inversely proportional to absorption member thickness, DCD capacitance can be reduced by increasing member thickness. In theory, DCD capacitance can be eliminated by increasing absorption member thickness. In reality, however, member thickness is limited by practical operational detector constraints.

Second, DCD capacitance is proportional to the areas of the cathode and anode. Therefore, by reducing the size of the DCD and providing a separate amplifier and processing circuitry for each DCD, total capacitance can be minimized.

Third, by reducing the size of the anode which collects the electron charge while essentially maintaining the size of the element on which the DCD capacitance forms, the overall effect of DCD capacitance can be substantially reduced. To this end, some members of the industry have developed detectors generally referred to as lateral drift detectors LDDs. A typical LDD includes an absorption member and a cathode as described above. However, an LDD includes at least one shaping electrode and one or more anodes, each of which is much smaller than the anode surface.

The anodes are spaced apart on and attached to the anode surface with electrode gaps therebetween. The electrode is attached to the anode surface between adjacent anodes and is configured such that a space exists between the electrode and each adjacent anode. The biasing mechanism biases each of the electrodes negative and also biases the cathode more negative than the electrode. Each anode is linked to a separate amplifier.

In operation, when a photon is absorbed and hole and electron pairs are generated, the shaping electrodes repel the electrons, all of which accumulate on one of the small anodes. The electrodes effectively add a transverse component to the electric fields. While essentially all of the electron charge accumulates on one of the anode, the capacitive charge is evenly distributed across the anode and electrode surface areas. Because the anode surface area comprises only a small portion of the combined areas of the anodes and electrode, capacitive noise is minimized.

In addition to DCD capacitance, incomplete charge collection adversely affects DCD energy resolution. Incomplete charge collection occurs when electrons and holes caused by an absorbed photon are not detected either (1) because of incomplete hole charge integration or (2) because of electron-hole recombination.

The time period required for electrons to traverse the distance from the absorption depth to the anode and for associated holes to traverse the distance from the absorption depth to the cathode will be referred to hereinafter as the collection period. Generally, it takes a longer time for a hole to travel to the cathode than it takes for an electron to travel to the anode. Therefore, the collection period is typically a measure of the time required for a hole to travel to the cathode and will depend on absorption depth. For example, a collection period corresponding to a first absorption depth will be shorter than a collection period corresponding to a second absorption depth which is relatively deeper and further from the cathode than the first depth.

Where the absorption depth is close to the cathode, the collection period will be relatively short. In this case, the processor's integration period will likely be longer than the collection period such that essentially all charge due to both holes and electrons is collected and integrated during the integration period. However, where the absorption depth is remote from the cathode and near the anode, the collection period may exceed the integration period such that the processor does not detect and integrate charge which is collected after the integration period (i.e. some hole charge due to slow traveling holes). In this case, the resulting intensity signal will underestimate the absorbed photon energy.

Incomplete charge collection also results from electron-hole recombination. As electrons and holes traverse toward the anode and cathode respectively, some holes and some electrons recombine within the absorption member and therefore never make it to the anode and cathode. Generally, because electrons travel through the absorption member at greater speeds than holes, more holes recombine than electrons. For this reason, the total charge detected by a processor also depends on the absorption depth. For example, if a photon is absorbed adjacent the cathode, most holes reach the cathode before recombining and a resulting intensity signal will essentially reflects the actual photon energy. However, if a photon is absorbed adjacent the anode so that holes have a longer distance to travel to the cathode, there is a good likelihood that many of the holes generated will be absorbed prior to reaching the cathode. In this case, the resulting intensity signal gain will indicate an incorrect energy level.

Several methods have been devised to compensate for, or minimize, incomplete charge collection in DCDs. According to a first method, because both the collection period and the extent of recombination are directly related to absorption depth, several detector systems have been designed which measure the rise time of the intensity signal and use the rise time to make a correction for incomplete charge collection. For example, on one hand, if intensity signal rise time is relatively slow, it can be assumed that the absorption depth is remote from the cathode and the intensity signal can be increased to compensate for incomplete charge. On the other hand, if intensity signal rise time is relatively quick, it can be assumed that the absorption depth is proximate the cathode and that the intensity signal reflects the actual energy level of the absorbed photon. In this case, the intensity signal is unchanged.

According to a second method, for a marker range, the fraction of gamma rays of a given energy that fall outside of the marker range due to incomplete charge collection can be measured during a quality control test for a given DCD. Multiple energy windows can then be used during imaging to map a portion of absorbed photons with energies below the marker range into the marker range.

According to a third method, by simply reducing anode sizes to a minimum and providing large shaping electrodes around the anodes, essentially all of the electron charge accumulates on a detecting anode and only a small fraction of the hole charge accumulates on the detecting anode. Therefore, only a small fraction of the hole charge error due to recombination or incomplete hole charge integration is detected by the detecting anode. A method of this type has been described in an article published in the 1995 IEEE Nuclear Science Symposium and Medical Imaging Conference Record, San Francisco, Cali., Vol. 1, pp. 544–548 entitled: "The Effect Of Pixel Geometry On Spatial And Spectral Resolution In A CdZnTe Imaging Array", by J D Eskin et al., which is incorporated herein by reference.

According to yet a fourth method, by interdigitating identically sized anodes and shaping electrodes where the anodes comprise precisely half of the total surface area of the anodes and electrodes combined, attaching the anodes and electrodes to the anode surface, connecting a first amplifier to the anodes, connecting a second amplifier to the shaping electrodes, anode and electrode signals, A and B, respectively, useable to identify a precise intensity signal can be generated. Anode signal A includes the entire electron charge. In addition, because the anodes comprise one half of the total surface area of the anodes and electrodes combined, anode signal A includes precisely one half of the hole charge while electrode signal B includes the other half of the hole charge. Subtracting electrode signal B from anode signal A then yields a modified signal which precisely indicates the electron charge. One example of this type of system is described in an article "Performance Of CdZnTe Coplanar-Grid Gamma-Ray Detectors, P. N. Luke and E. E. Eissler, IEEE Transactions on Nuclear Science, Vol. 43, No. 3, Jun. 1996, pp. 1481, which is incorporated herein by reference.

While each of the systems described above can generate photon imaging data, unfortunately the most accurate of the systems have a number of shortcomings. DCD detectors which are sufficiently accurate for diagnostic purposes use a large number of pixilated DCD elements, each element including a separate anode and corresponding low noise amplifier. The maximum size of the pixilated element is determined primarily by the spatial resolution required for imaging purposes. For example, to satisfy the sampling requirement for 4 mm spatial resolution, element dimensions should be smaller than 2 mm. Unfortunately, such small dimensions mean that a huge number of pixilated elements are required to configure a usefully sized camera head. For example, a camera having a FOV of 18 cm by 34 cm would contain approximately 15,300 2 mm by 2 mm elements, each element having a separate and dedicated amplifier and electronic channel. Such a large number of elements and electronic channels is undesirable for several reasons.

First, each element and corresponding channel must be separately configured. While the cost associated with each element and channel is not extremely high, camera configurations including several thousand channels associated with a DCD camera can be cost prohibitive Second, each element and corresponding channel consumes approximately 1 milliwatt of power during operation to drive the amplifiers and channel electronics. Such high power consumption renders a fully configured DCD camera relatively inefficient and can require a complex cooling system to ensure that the DCD operates at a low temperature and therefore low leakage current.

Third, because each camera requires so many elements and channels, the probability of camera failure is quite high. For example, if the probability of failure per element and channel is 1 in one million, the probability of failure in the detector is approximately 1.5%. In most diagnostic environments a 1.5% probability of failure is unacceptably high.

Therefore, it would be advantageous to have a simple direct conversion detector configuration which requires a minimal number of amplifiers and electronic channels yet minimizes DCD capacitance, minimizes the effects of incomplete charge collection and increases both spatial and energy resolution.

BRIEF SUMMARY OF THE INVENTION

Instead of providing a large number of pixilated detecting elements, each element requiring its own amplifier and electronic channel, the present invention includes a resistive network and at most four amplifiers and corresponding electronic channels per DCD to facilitate adequate spatial resolution. Thus, the inventive DCD has a relatively inexpensive configuration. In addition, because only four amplifiers and corresponding channels are required for each DCD and the resistive network is extremely robust, a camera configured using the inventive DCDs has a relatively low probability of failure. Moreover, because only four amplifiers and corresponding channels are required for each DCD, the inventive DCD uses much less power than other DCD configurations.

Specifically, the inventive DCD includes an absorption member having oppositely facing cathode and anode surfaces, a cathode attached to and covering the cathode surface, a plurality of anodes including at least first and second anodes, the anodes spaced apart and attached to the anode surface such that electrode gaps are formed between adjacent anodes, a shaping electrode which is attached to the anode surface in the gaps between adjacent anodes, the electrode configured such that spaces are formed between the electrode and adjacent anodes, a biasing mechanism which maintains the electrode negative and the cathode more negative than the electrode and a resistive network.

The anodes are arranged in a two dimensional array including anode columns and rows. The array includes four corner anodes, a separate corner anode at each of four corners of the DCD. A separate amplifier is linked to each of the four corner anodes. The resistive network links the anodes together. Preferably, the network provides a resistance between each two adjacent anodes in a first column, between each two adjacent anodes in a last column and between each two adjacent anodes in the same row.

When a photon is absorbed by the absorption member, electrons and holes are generated. The holes are attracted toward the cathode while the electrons are attracted toward the anode. The shaping electrode repels the electrons and therefore all electron charge accumulates on one of the anodes referred to herein as a detecting anode. The holes cause hole charge to be distributed across the electrode and anode surfaces. Similarly the DCD capacitance is evenly distributed across the electrode and anode surfaces.

Because the combined anode surface areas are only a small fraction of the combined electrode and anode surface areas, only a small fraction of the noise from DCD capacitance is detected by the anodes. For this same reason, only a small fraction of the hole charge is detected by the anodes. Because only a small fraction of the hole charge is detected by the anodes, only a small fraction of the error in hole charge due to hole recombination and incomplete integration of the hole charge is included in the anode signals generated by each anode.

Each anode generates an anode signal. Each anode signal includes a small component from detected DCD capacitance and each also includes a small component from detected hole charge. However, only the detecting anode also includes a relatively large component from electron charge. The detecting anode signal is linked to each of the amplifiers through the resistive network. Thus, each amplifier receives a signal from the detecting anode. Unless the detecting anode is one of the corner anodes, each amplifier receives an attenuated anode signal, the degree of signal attenuation depending on the total resistance between the amplifier and the detecting anode. Where the detecting anode is a corner anode, the amplifier linked to the detecting anode receives an unattenuated anode signal. By comparing the attenuated anode signals from all four amplifiers, the location of the detecting amplifier can be determined.

It should be appreciated that with the inventive DCD configuration, the total number of amplifiers and corresponding electronic channels is reduced substantially. For example, for a 4 by 4 array of anodes (i.e. pixilated elements), the inventive design reduces the number of channels by a factor of 4 from other pixilated designs. In addition, the inventive design reduces DCD capacitance and charge error due to incomplete charge collection.

Objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

A. Hardware and Operation

Figure 1:
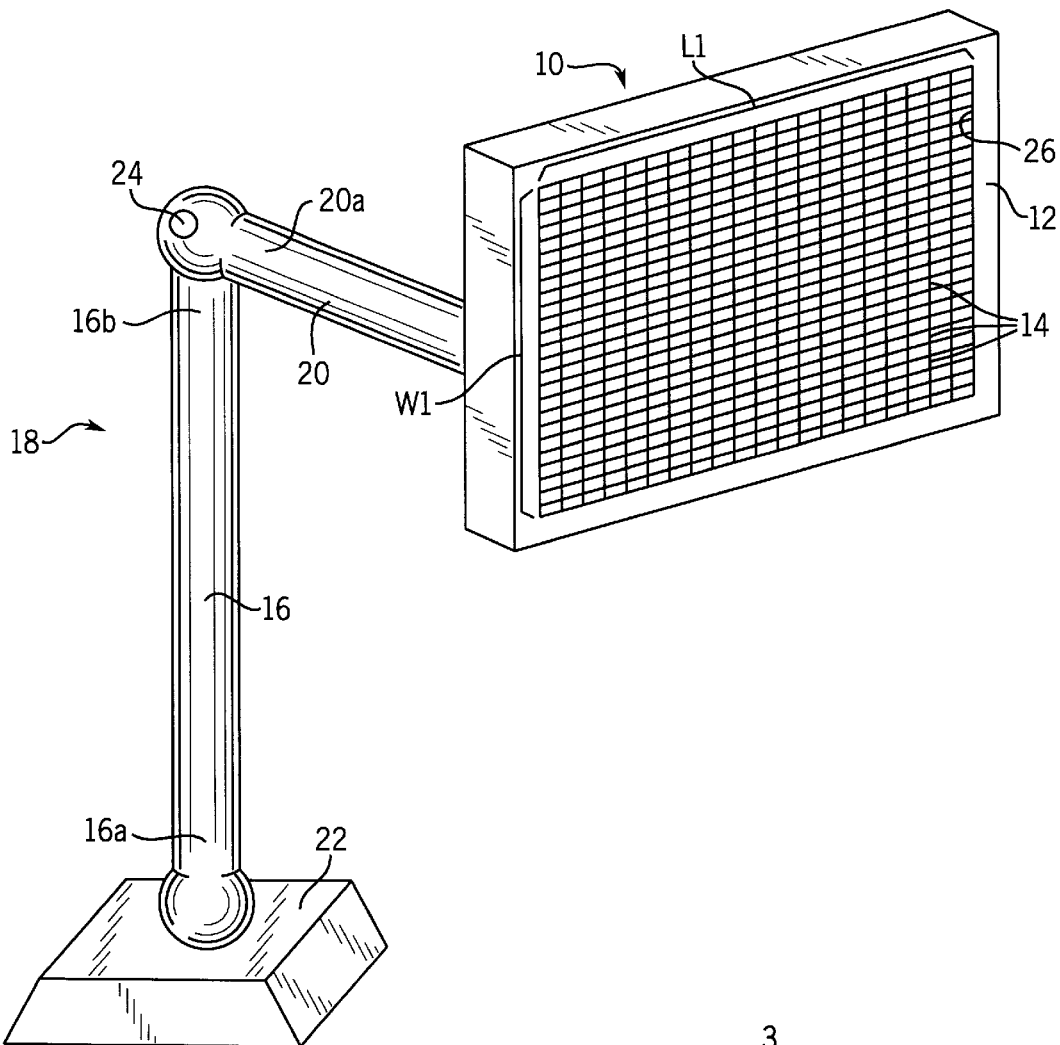
FIG. 1 is a perspective view of a direct conversion photon detector camera mounted on a stand.

Referring now to the drawings, wherein like reference characters and numbers represent corresponding elements throughout the several views, and more specifically, referring to FIG. 1, therein is illustrated a single direct conversion detector camera 10 mounted at the distal end of a swing arm 18 including first and second members 16, 20, respectively.

First member 16 is mounted at a lower end 16a to a base member 22 which can support member 16 in any of a plurality of different partially vertical positions. Second member 20 is mounted at a first end 20a to a second end 16b of member 16 and can be pivoted about a pivot axis 24 into any of several different positions with respect to member 16. Although not illustrated, camera 10 is mounted to the second end (opposite end 20a) of member 20 for pivotal rotation about a second pivot axis. Thus, camera 10 can be moved into any of a plurality of different positions.

Detector 10 includes a radiation attenuating boot 12 and a plurality (e.g. 1,000) of direct conversion detectors (DCD) collectively referred to by numeral 14. Boot 12 essentially forms an open-faced box wherein the open face defines an alcove 26 having a width W1 and a length L1. Width W1 and length L1 define a camera field of view (FOV). DCDs 14 are arranged within alcove 26 to form a plurality of columns along length L1 and a plurality of rows along width W1. Although not illustrated, a collimator is provided which covers width W1 and length L1 and defines preferred photon paths perpendicular to length L1 and width W1. Only photons traveling along the preferred paths pass through the collimator.

Figure 2:
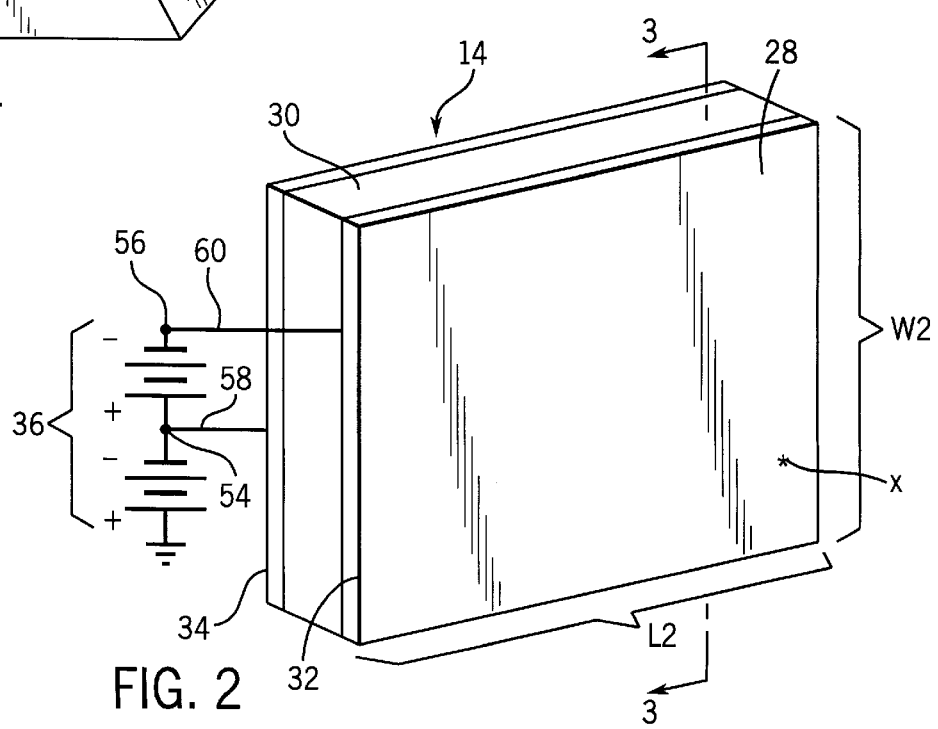
FIG. 2 is a perspective view of a direct conversion detector.
Figure 3:
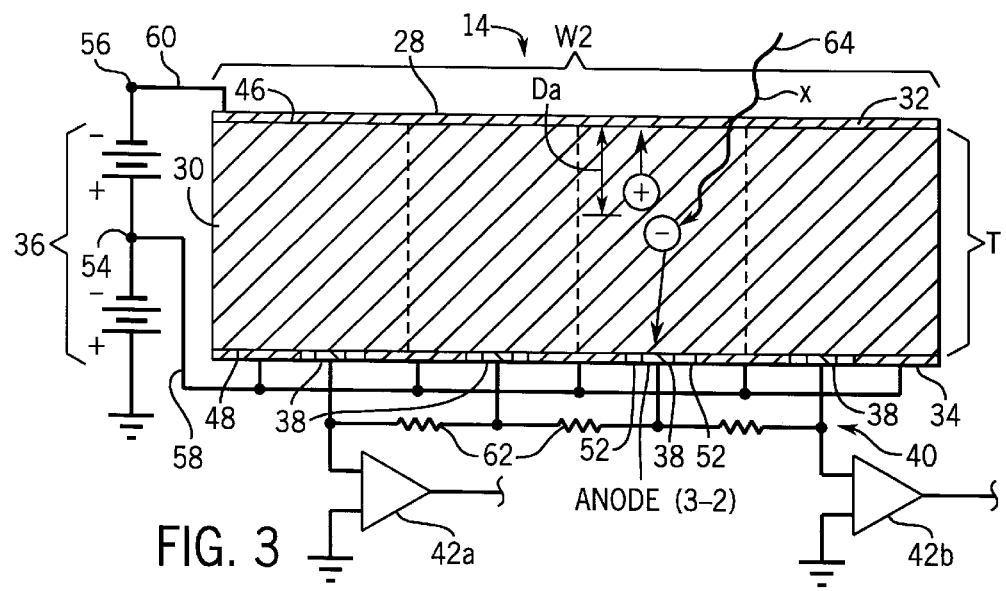
FIG. 3 is a cross-sectional view taken along the line 3—3 of FIG. 2.
Figure 4:
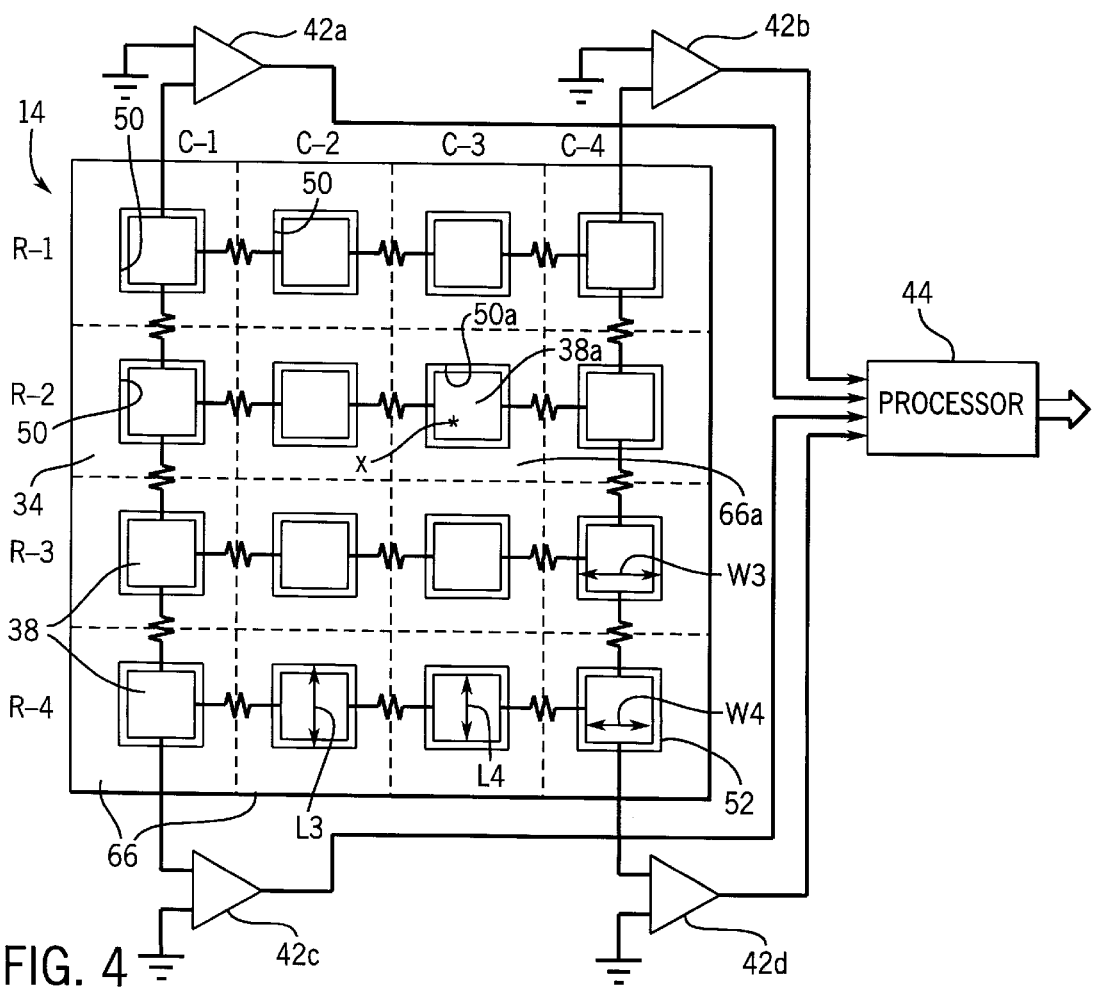
FIG. 4 is a schematic view of the detector of FIG. 3 illustrating an anode surface configuration and a resistive network configuration.

Referring also to FIGS. 2, 3 and 4, each DCD 14 defines a detecting surface area 28 having a width W2 and length L2. While width W2 and length L2 are preferably identically sized, these two dimensions need not be the same. Each photon directed at surface area 28 impacts surface area 28 at an impact point, penetrates DCD 14 and is absorbed therein. DCD 14 includes a plurality of components which cooperate to determine both the energy level of each absorbed photon and to generally identify the impact point of each absorbed photon along surface area 28.

To this end, DCD 14 includes an absorption member 30, a cathode 32, a shaping electrode 34 and a biasing mechanism in the form of a voltage source 36. In addition, referring specifically to FIGS. 3 and 4, DCD 14 also includes a plurality of anodes collectively referred to by numeral 38, a resistive network 40 and four low-noise amplifiers 42a, 42b, 42c and 42d. A processor 44 is provided to process signals from amplifiers 42a through 42d.

Referring still to FIGS. 3 and 4, absorption member 30 is a rectilinear member having a thickness T and having oppositely facing cathode and anode surfaces 46, 48, respectively. Member 30 is formed of some semiconductor material and is preferably formed of CdTe or CdZnTe.

Referring to FIGS. 2 and 3, cathode 32 is a planar rectilinear member having dimensions W2, L2 and defines detecting surface area 28 on one side. Cathode 32 is attached to and essentially entirely covers cathode surface 46. While cathode 32 must be electrically conductive, it should not be formed of a photon attenuating material so that photons directed at surface area 28 penetrate therethrough and are received within absorption member 30.

Referring to FIGS. 2, 3 and 4, shaping electrode 34 is a planar, electrically conductive and generally rectilinear member having width and length dimensions which are essentially identical to width dimension W2 and length dimension L2 of cathode 32. Electrode 34 defines a plurality of apertures collectively referred to by numeral 50. While any number of different apertures might be provided, and the apertures might have any of several different shapes, in the preferred embodiment illustrated and described herein, electrode 34 forms 16 square apertures 50 arranged to form four columns C-1, C-2, C-3 and C-4 and four rows R-1, R-2, R-3 and R-4. Hereinafter, when a specific electrode aperture 50 is referred to, the aperture will be referred to by its column and row numbers. For example, referring still to FIG. 4, aperture 50a will be referred to as aperture 3-2. All apertures 50 have identical length L3 and width W3 dimensions. Shaping electrode 34 is integrally attached to anode surface 48.

Referring to FIGS. 3 and 4, a separate anode 38 is provided for each electrode aperture 50. In addition, preferably, each anode has a shape which reflects the shape of a corresponding aperture 50, but with slightly smaller dimensions. Thus, in the present example, because electrode 34 defines 16 square apertures 50, sixteen square anodes 38 are provided, each anode having width W4 and length L4 dimensions which are slightly smaller than width W3 and length L3 dimensions, respectively. Each anode 38 is formed of an electrically conductive material and is attached to anode surface 48 within a corresponding aperture 50, one anode 38 per aperture 50. Thus, anodes 38, like apertures 50, are arranged in columns C-1, C-2, C-3 and C-4 and rows R-1, R-2, R-3 and R-4. Hereinafter, when a specific anode 38 is referred to, the anode will be referred to by its column and row numbers. For example, in FIG. 4, anode 38a would be referred to as anode 3-2.

Because anode dimensions W4 and L4 are less than aperture dimensions W3 and L3, when electrode 34 and anodes 38 are attached to anode surface 48, small spaces 52 are provided between the electrode 34 and adjacent anodes 38.

Voltage source 36 provides first and second negative terminals 54, 56, respectively, wherein second negative terminal 56 is more negative than terminal 54. Terminal 54 is connected to electrode 34 via a line 58 while terminal 56 is connected to cathode 32 via a line 60. Thus, electrode 48 is biased negative and cathode 32 is biased so as to be more negative than electrode 48. Anodes 38 remain unbiased.

Resistive network 40 includes a plurality of resistors collectively referred to by numeral 62. Network 40 links anodes 38 together. While other resistive network configurations could be employed, a preferred network includes a separate resistor 62 between each two adjacent anodes in column C-1, between each two adjacent anodes in column C-4 and between each two adjacent anodes in the same row. With this configuration, the number of resistors 62 required to form network 40 is:

$$\#=R(C-1)+2(C-1) \qquad \text{Eq. 1}$$

where R is the number of rows and C is the number of columns of anodes 38.

Amplifiers 42a, 42b, 42c and 42d each have one input grounded and a second input connected to a unique corner anode, the corner anodes being anodes 1-1, 4-1, 1-4 and 4-4. Specifically, amplifier 42a is connected to anode 1-1, amplifier 42b is connected to anode 4-1, amplifier 42c is connected to anode 1-4 and amplifier 42d is connected to anode 4-4. The outputs of each amplifier 42a, 42b, 42c and 42d are provided to processor 44.

In operation, with a marker, including radial pharmaceutical, accumulated within an organ of interest (i.e., an organ to be imaged), and with the organ positioned within an imaging area adjacent camera 10, photons produced by a radiopharmaceutical radiate from the organ in all directions. Each photon directed at camera 10 impacts one detector 14 at an impact location. Referring to FIGS. 2, 3 and 4, for the purposes of this explanation, it will be assumed that a photon impact point occurs at the point on surface area 28 marked by letter X. The impacting photon, represented in FIG. 3 by arrow 64, passes through cathode 32 and enters absorption member 30. Photon 64 continues to travel through member 30 until it is absorbed by member 30 at an absorption depth $D_a$. During the absorption process, a plurality of holes and electrons are generated at depth $D_a$.

Because cathode 32 is biased relatively more negative than both electrode 34 and anodes 38, the positively charged holes are attracted toward cathode surface 46 while the negatively charged electrons are attracted toward anode surface 48. Similarly, because electrode 34 is biased negative with respect to anodes 38, electrode 34 effectively laterally displaces electrons as they travel toward surface 48, directing electrons toward whichever anode 38 is closest to the point at which photon 64 was absorbed. In effect, shaping electrode 34 divides or pixilates absorption member 30 into sixteen separate and equally sized pixilated square elements, a separate element associated with each anode 38. In FIG. 4, the pixilated elements are identified by dotted lines and are collectively referred to by numeral 66. Elements 66, like anodes 38, are arranged in columns C-1, C-2, C-3 and C-4 and rows R-1, R-2, R-3 and R-4. Therefore, in order to simplify this explanation, hereinafter when a specific pixilated element is referred to the element will be referred to by its column and row numbers. For example, element 66a will be referred to as element 3-2. Separate elements 66 are also illustrated in FIG. 3 by dashed lines.

Thus, essentially all electrons generated by an absorbed photon cause electron charge on a single detecting anode 38. In the present example, because photon 64 was absorbed within pixilated element 3-2, all electron charge is sensed by anode 3-2.

As the positively charged holes accumulate adjacent cathode 32, those holes cause a distributed negative charge to form at anode surface 48. The charge is distributed over the surface area across electrode 34 and each of anodes 38. Thus, only a very small fraction of the hole charge (i.e., negative charge caused by the holes) accumulates on detecting anode 3-2. Similarly, any DCD capacitance due to negatively charged cathode 32 is evenly distributed per unit surface area across electrode 34 and anodes 38 such that very little capacitive charge is provided on detecting anode 3-2. Each of anodes 38 provides an anode signal to resistive network 40. The signal provided by anode 3-2 includes a small component due to hole charge, a small component due to DCD capacitance and a relatively large component due to electron charge. All other anode signals include small components due to hole charge and DCD capacitance.

Referring to FIGS. 3 and 4, each anode 38 provides an anode signal to resistive network 40 which is proportional to the charge on the anode. Each anode signal propagates through resistive network 40 to each of amplifiers 42a, 42b, 42c and 42d. As an anode signal propagates through network 40 toward each amplifier 42a, 42b, 42c and 42d, the signal is attenuated by network resistor 62. The amount of signal going to a specific amplifier depends upon the amount of resistance between a specific anode and a specific amplifier. For example, referring specifically to anode 3-2, assuming identical resistors 62, there is more resistance between anode 3-2 and amplifier 42a than there is between anode 3-2 and amplifier 42b. Therefore, an anode signal generated by anode 3-2 will provide a greater signal to amplifier 42b than it will to amplifier 42a. Similarly, because there is greater resistance between anode 3-2 and amplifier 42c than there is between anode 3-2 and amplifier 42d, anode 3-2 provides a greater signal to amplifier 42d than it does to amplifier 42c.

There is also a greater resistance between anode 3-2 and amplifier 42d than between the anode 3-2 and amplifier 42b, therefore anode 3-2 will provide a larger signal to amplifier 42b than to amplifier 42d. Likewise, the resistance between anode 3-2 and amplifier 42c is greater than the resistance between anode 3-2 and amplifier 42a, therefore anode 3-2 will provide a larger signal to amplifier 42a than to amplifier 42c.

Amplifiers 42a, 42b, 42c and 42d provide amplifier signals A, B, C and D to processor 44. The total signal generated by photon 64 is determined by summing signals A, B, C and D by processor 44 according to the following equation:

$$E = A+B+C+D \qquad \text{Eq. 2}$$

where E is the total signal. To identify the column in which photon 64 is absorbed, processor 44 solves the following equation:

$$X = (B+D)/E \qquad \text{Eq. 3}$$

wherein X is a column position signal. Then, processor 44 can use a look-up table to compare the value of signal X to stored signal values which correlate signal intensity with column number. For example, signal intensities might be divided into four different groups including a low intensity range, a moderate intensity range, a medium intensity range which is greater than the moderate intensity range and a high intensity range. Where signal X is in the low intensity range, the look-up table indicates column C-1. Where signal X is in the moderate range, the look-up table indicates column C-2. Where signal X is in the medium range, the look-up table indicates column C-3. Where signal X is within the high intensity range, the look-up table indicates column C-4.

Similarly, to determine the row in which photon 64 is absorbed, processor 44 solves the following equation:

$$Y = (C+D)/E \qquad \text{Eq. 4}$$

where Y is a row position signal. Once again, after position signal Y is identified, processor 44 can access a look-up table to compare signal Y to intensity ranges and correlate signal Y with one of rows R-1, R-2, R-3 or R-4. In this manner, in the present example, processor 44 determines that photon 64 was absorbed within pixilated element 3-2.

It should be appreciated that a relatively simple direct conversion detector configuration has been described which includes a relatively small number of amplifiers and corresponding electronic channels yet still facilitates relatively precise energy resolution performance. In addition to requiring very few electronic components, the inventive configuration minimizes detector noise due to DCD capacitance and incomplete charge collection.

B. Other Embodiments

Figure 5:
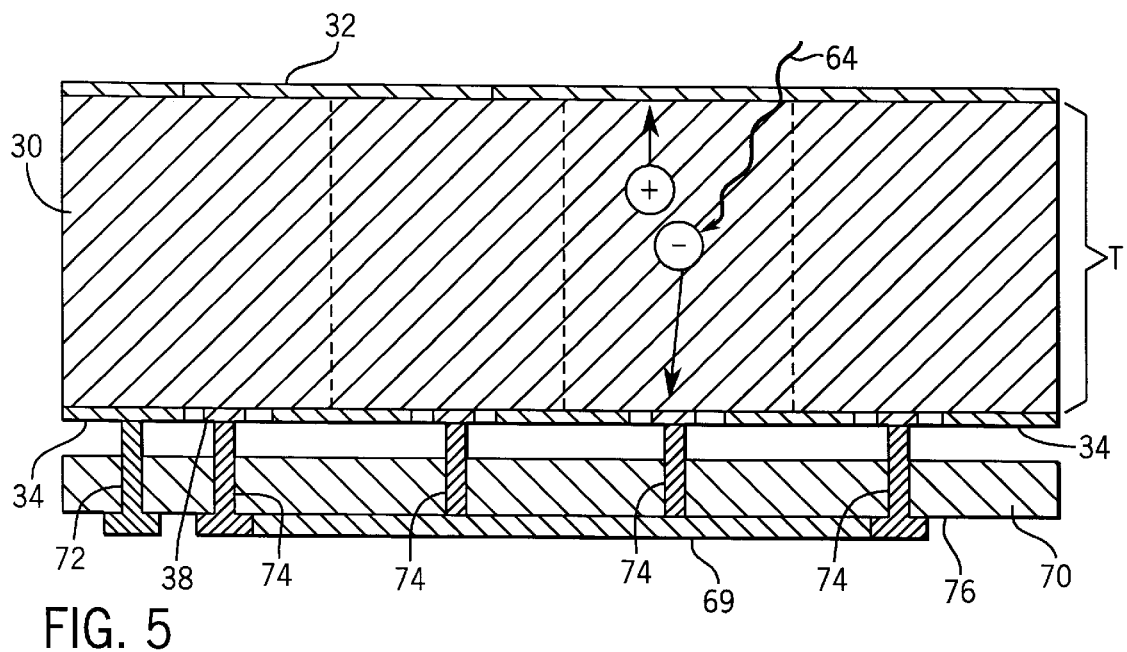
FIG. 5 is a cross-sectional view, similar to the view of FIG. 3, albeit of a second embodiment of the inventive detector.

Referring now to FIG. 5, a second embodiment of the inventive DCD is illustrated. In this embodiment, several of the components are identical to the components described above with respect to the first embodiment, are referenced by the same numbers and will not be explained here again in detail. Generally, this second embodiment includes absorption member 30, cathode 32, shaping electrode 34 and a plurality of anodes 38 which are configured in the same manner described above. Although not illustrated, a voltage source is provided for the second embodiment which biases cathode 32 and electrode 34 in the same manner described above. Generally, this second embodiment is different than the first embodiment in that, instead of having a resistive network including a plurality of individual resistors, this embodiment employs a plurality of resistive metal runs 69 (only one shown) to provide resistance between anodes 38. In addition, this second embodiment includes a ceramic mounting board 70, an electrode lead 72 and a plurality of anode leads collectively referred to by numeral 74, a separate anode lead 74 for each anode 38. Leads 72 and 74 are integrally attached to electrode 34 and anodes 74 and extend down therefrom through board 70 to an undersurface 76. Board 70 is electrically non-conductive.

Referring to FIGS. 4 and 5, where there are four columns and four rows of anodes 38, six separate resistive runs 69 are provided. A first resistive run 69 is provided to link all anodes in row R-1, a second to link all anodes in row R-2, a third to link all anodes in row R-3, a fourth to link all anodes in row R-4, a fifth to link all anodes in column C-1 and a sixth to link all anodes in column C-4. To link corresponding anodes, each run 69 is secured on undersurface 76 so as to make electrical contact with distal ends of contacts 74 which are linked to corresponding anodes. This second embodiment is advantageous in that it requires less processing adjacent the absorption member 30.

Figure 6:
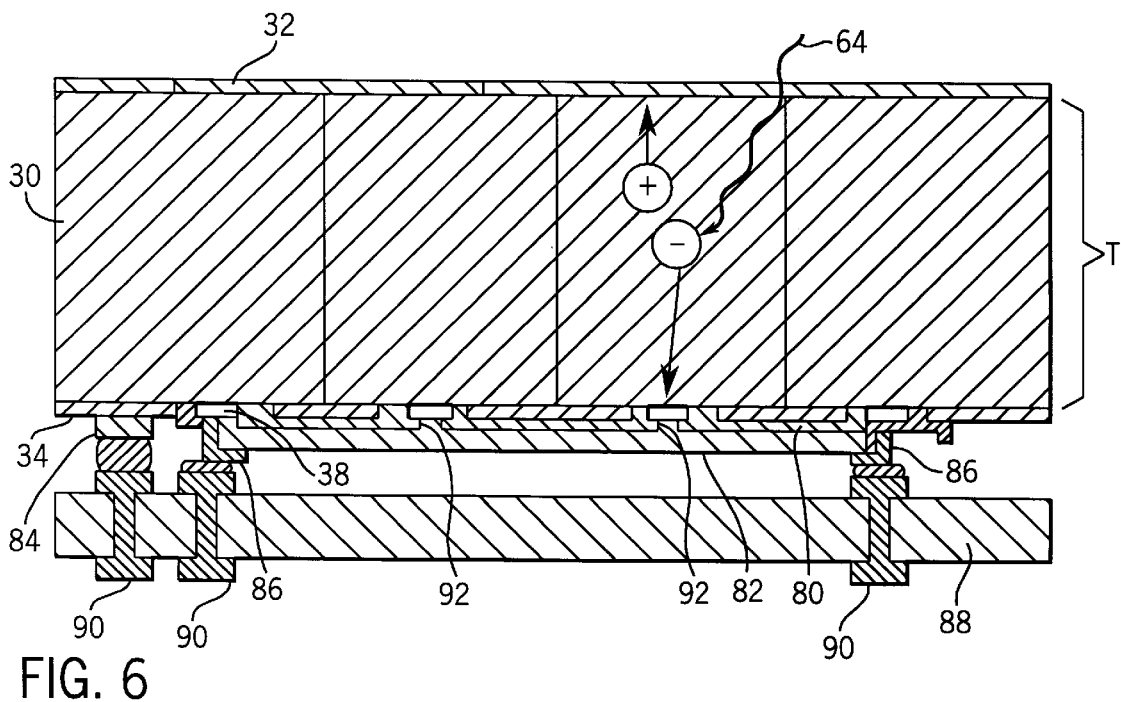
FIG. 6 is a cross-sectional view, similar to the view of FIG. 3, albeit of a third embodiment of the inventive detector.

Referring now to FIG. 6, a third embodiment of the inventive DCD is illustrated. This embodiment is similar to the first and second embodiments, including various components which are identified by the same numbers and will not be explained again here in detail.

Generally, this third embodiment includes absorption member 30, a cathode 32, a shaping electrode 34 and a plurality of anodes collectively referred to by numeral 38. Although not illustrated, this third embodiment also includes a voltage source for biasing cathode 32 and electrode 34 negative. This third embodiment has been designed such that it can be manufactured using multiple deposition techniques well known in the semiconductor industry. This third embodiment includes an insulating layer of material 80, a resistive layer collectively referred to by numeral 82 (only one shown), and electrode output pad 84, four anode output pads collectively referred to by numeral 86 (only two shown), a ceramic mounting board 88 and electrical soldier pads collectively referred to by numeral 90. This third embodiment is formed by depositing insulating layer 80 over electrode 34 and anodes 38 leaving small apertures collectively referred to by numeral 92 through layer 80 adjacent each anode 38. In addition, at least some small portion of electrode 34 must be left uncovered. Next, resistive layer 82 is deposited adjacent insulating layer 80 between the area defined by apertures 92 such that the resistive layer makes contact with each anode 38. Then, output pads 84 and 86 are deposited. Next, pads 84 and 86 can be soldiered to soldier pads 90 to mount the detector to board 88.

There are several advantages associated with this third embodiment. First, there are fewer interconnections between the detector and the ceramic board which increases the reliability of the unit and decreases the cost of the ceramic board. Second, since each pixilated element (see FIG. 4) no longer requires a separate connection, making detectors with extremely small pixels becomes more practical. Thus, better spatial resolution can be provided by increasing sampling and by reducing the maximum distance that electrons must drift laterally.

It should be understood that the methods and apparatuses described above are only exemplary and do not limit the scope of the invention, and that various modifications could be made by those skilled in the art that would fall under the scope of the invention. For example, while the DCD described includes sixteen pixilated elements, clearly the invention is not so limited but could include fewer or greater pixilated elements. In addition, while the pixilated elements in the described embodiment are ranged in an equal number of rows and columns, the elements might be arranged in a different two-dimensional configuration or, for that matter, could be arranged along a single line. Moreover, while processor 44 has been described as using a centroid calculation to determine the row and column in which a photon has been absorbed, other algorithms well known to one of ordinary skill in the art can be used. Furthermore, while the invention is described as one using a cadmium-telluride type detector, clearly, the inventive configuration could be used with any type of DCD.

To apprise the public of the scope of this invention, I make the following claims:

I claim:

1. A direct conversion photon detector comprising:
   an absorption member for absorbing photons, the member having oppositely facing cathode and anode surfaces and formed of a semiconductor material such that, when a photon is absorbed within the member, the member generates a plurality of holes and electrons;
   a cathode member attached to and essentially covering the cathode surface;
   a plurality of anode members including at least first and second anode members, each anode member attached to the anode surface, adjacent anode members separated by an electrode gap;
   at least one shaping electrode attached to the anode surface in the electrode gaps, the electrode and each adjacent anode member forming a space therebetween;
   a biaser linked to each of the cathode and electrode for rendering an electrode potential negative and rendering a cathode potential negative with respect to the electrode potential;
   a resistive member linking each anode member to at least one other anode member; and
   at least first and second amplifiers linked to the first and second anode members, the amplifiers generating position signals which can be used to estimate photon impact location with respect to the cathode surface.

2. The detector of claim 1 wherein the absorption member is formed of a semiconductor material selected from the group consisting of Cadmium Telluride and Cadmium Zinc Telluride.

3. The detector of claim 1 wherein the plurality of anode members includes at least four anode members arranged in C columns and R rows, the amplifiers include first, second, third and fourth amplifiers, the first amplifier linked to the anode member in the first column and first row, the second amplifier linked to the anode member in the Cth column and first row, the third amplifier linked to the anode member in the first column and the Rth row and the fourth amplifier linked to the anode member in the Cth column and the Rth row.

4. The detector of claim 3 wherein the resistive member includes R*(C-1)+2(C-1) resistive segments, the segments including a separate segment between each two adjacent anode members in the first column, a separate segment between each two adjacent anode members in the Cth column and a separate segment between each two adjacent anode members in adjacent columns.

5. The detector of claim 3 wherein the anode members include at least sixteen anode members.

6. The detector of claim 1 wherein the electrode surrounds each of the anode members.

7. The detector of claim 1 wherein each anode member includes first and second oppositely facing surfaces, each anode member attached to the anode surface along its first surface, the detector also including an electrical insulator linked to the second surfaces, the resistive member including a resistive layer attached to at least a portion of an insulator surface opposite the anode members, each anode members electrically linked through the insulator to the resistive layer.

8. The detector of claim 7 wherein the detector also includes a plurality of electrical contacts, a separate contact linked to each of the anode members, each contact extending through the insulator to the resistive layer.

9. The detector of claim 8 wherein the resistive layer is formed by depositing a resistive material on the insulator.

10. The detector of claim 7 wherein the insulator is a first insulator, the detector further includes a plurality of electrical contacts and a second insulator, each anode member linked to an amplifier is an output anode, a separate contact is attached to each output anode, the first insulator is attached to the anode member second surfaces, the second insulator is spaced apart from the resistive layer and each contact extends through the first and second insulators.

11. The detector of claim 10 wherein the first insulator is formed by depositing an insulator material on the anode member second surfaces and the resistive layer is formed by depositing a resistive material on the first insulator.

* * * * *